United States Patent [19]

Drabish

[11] E Patent Number: Re. 33,680

[45] Reissued Date of Patent: Sep. 3, 1991

[54] REUSABLE GREETING CARD

[76] Inventor: Steve Drabish, 7740 Dunham Rd., Walton Hills, Ohio 44146

[21] Appl. No.: 244,032

[22] Filed: Sep. 14, 1988 (Under 37 CFR 1.47)

Related U.S. Patent Documents

Reissue of:

[64] Patent No.: 4,613,157
Issued: Sep. 23, 1986
Appl. No.: 514,937
Filed: Jul. 18, 1983

[51] Int. Cl.[5] ..... B42D 19/00; B42D 1/00; B42D 15/00; B41L 1/20

[52] U.S. Cl. ..... 281/5; 281/11; 283/116; 229/92.8

[58] Field of Search ..... 281/5; 282/11.5 R, 25; 283/1 R, 1 B, 116; 229/92.7, 92.8, 68 R; 40/124.1

[56] References Cited

U.S. PATENT DOCUMENTS

| | | | |
|---|---|---|---|
| 460,472 | 9/1891 | Hitt | 283/1 B |
| 814,843 | 3/1908 | Hawes | 229/92.8 |
| 970,943 | 9/1910 | Newell | 283/1 R |
| 1,031,521 | 7/1912 | Cameron | 283/1 R |
| 2,169,932 | 8/1939 | Sweet et al. | 283/1 R |
| 2,417,982 | 3/1947 | Histed | 229/92.8 |
| 2,497,064 | 2/1950 | Baynes | 229/92.8 |
| 3,259,304 | 7/1966 | Tichnor | 281/5 |
| 3,330,581 | 7/1967 | Wallerstrom | 281/5 |
| 3,525,469 | 8/1970 | Sawdon | 229/92.7 |
| 3,941,309 | 3/1976 | Gendron | 283/113 |
| 4,070,778 | 1/1978 | Mahler et al. | 40/124.1 |
| 4,435,001 | 3/1984 | Mills et al. | 283/1 B |
| 4,538,833 | 9/1985 | Trikilis | 281/5 |

FOREIGN PATENT DOCUMENTS

| | | | |
|---|---|---|---|
| 79660 | 3/1918 | Switzerland | 229/92.3 |

*Primary Examiner*—Douglas D. Watts
*Assistant Examiner*—Paul M. Heyrana, Sr.
*Attorney, Agent, or Firm*—R. A. Johnston

[57] ABSTRACT

A reusable greeting card formed of a single-folded sheet having the greeting message provided on the upper portion of the card. The sheet is vertically folded and has at least one removable first sender's signature section extending across the bottom of the card and attached to the card by a frangible section. A second signature section is provided above the frangible area, thus allowing the card to be reused upon removal of the first signature section. Different size envelopes are provided with the card one of which is sized to receive the card only after removal of the first signature portion.

12 Claims, 2 Drawing Sheets

REUSABLE GREETING CARD

Matter enclosed in heavy brackets [ ] appears in the original patent but forms no part of this reissue specification; matter printed in italics indicates the additions made by reissue.

BACKGROUND OF THE INVENTION

Recent trends in the greeting card market have seen the increased size, elaborateness and cost of greeting cards for special occasions. Whereas, formerly it was the practice to purchase low cost cards for special occasions such as Christmas, St. Valentine's Day, Easter and other widely celebrated occasions and mail such cards to a large number of acquaitences and friends, it has more recently become the practice to send greeting cards to only a selected few individuals on special occasions. Furthermore, the fourfold increase in the cost of postage in the last decade has made the mailing of cards to a substantial number of persons prohibitively expensive.

This trend has been evidenced by the marketing of highly decorative and enlarged, more costly greeting cards for special occasions. These highly elaborate, decorative and more costly greeting cards which are mailed on special occasions have become sufficiently valuable to make it worthwhile to the recipient to consider ways or means of reusing the card for mailing again to another intended recipient on a future special occasion. This idea is particularly attractive on the occasion of the anniversary of the original receipt of the card for a recurring special occasion. However, in order to reuse the greeting card, it is socially necessary to remove the indicia of the original sender in order that subsequent recipients will not be aware that the card has been reused by the immediate sender.

It has thus been desired to find a way or means of providing a space for the signature of the immediate sender of the greeting card and provide for the removal of the signature by the recipient for enabling the recipient to reuse the card. In particular, it has been desired to find a way to make a reusable card with a removable signature feature which is not readily apparent or particularly noticeable.

SUMMARY OF THE INVENTION

The present invention comprises a reusable greeting card and envelope ensemble which provides a solution to the above-described problem and enables the recipient of the card to remove the signature of the sender in a manner which maintains the appearance of the card as though it were a new card purchased by the immediate recipient for initial use. The present invention provides a greeting card and envelope ensemble wherein the card has a plurality of removable signature strips integrally formed at the bottom thereof extending across the width of a single fold card. The strips in one embodiment are formed by a line of spaced perforations extending across the full width of the single fold card. The lowermost strip is used as a signature area by the immediate sender and may thus be removed by the recipient with little or no trace of removal. The immediate recipient may then use the then next-above signature strip for sending the card to another recipient.

Since the card of the present invention has its largest size when used by the initial sender, subsequent usage reduces the size of the card by removal of the signature strip. Accordingly, a plurality of nested envelopes of progressively decreased size are provided with the initial purchase of the card for enabling the immediate sender to forward the card with sufficient envelopes to enable the recipient to reuse the card and forward same for subsequent usage.

In another embodiment of the invention, a reusable greeting card comprises a plurality of single layers joined at the left margin therein in superposed relationship with the top layer being the shortest in length and each successive layer thereunder of a sufficiently greater length to provide a signature portion visible from above. The layers are removable from the bottom by peeling apart the adhesive bond along the margin to remove the bottom layer having the signature of the most recent sender leaving the remaining layers with the signature portion thereof unused.

DETAILED DESCRIPTION

Figure 1:
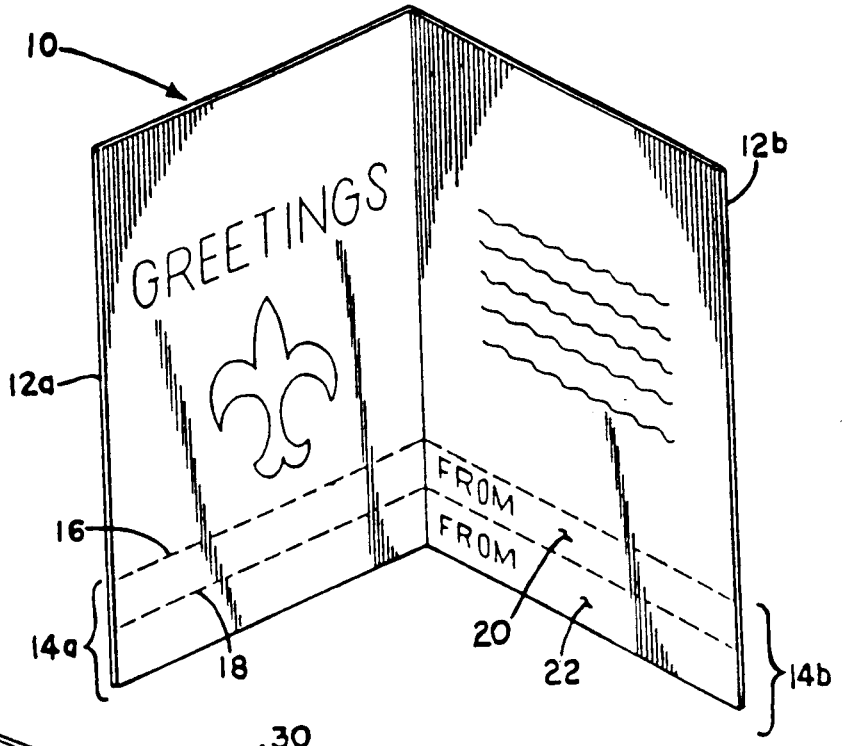
FIG. 1 is a perspective view of the single fold card of the invention having perforated signature strips along the bottom thereof.

Referring now to FIG. 1, the invention is shown as embodied in a single fold greeting card, indicated generally at 10, which may have any appropriate decorative indicia and greeting message provided thereon for example, birthday wishes or a message for other special occasions. In the embodiment of FIG. 1 the decorative indicia and message are disposed on the upper portion of the card designated 12a, 12b for respectively, the left-hand and right-hand portions thereof. The region provided for signature comprises the lower portion of the card designated 14a, 14b.

The signature region 14a, 14b comprises a plurality of horizontally extending strips formed by spaced pre-weakened areas 16, 18 which extend across the full width of the card 12a, 12b in spaced parallel relationship to thereby form a plurality of signature strips 20, 22. In the presently preferred practice of the invention, the pre-weakened areas 16, 18 are formed by lines of perforations spaced therealong which lines extend across the width of the card. However, it will be understood that other preweakening techniques may be employed as for example, the formation of a plurality of frangible creases embossed in the card at the time of manufacture. Furthermore, it will be understood that the card 10 of FIG. 1 may be formed with more than two signature strips 20, 22 if desired for increased multiple usage.

In use, the initial sender signs the card on the strip indicated by reference numeral 22 in FIG. 1, or the lowermost strip, and sends the card, leaving blank the upper signature strip denoted by reference numeral 20 in FIG. 1. The first recipient of the card merely folds the used lower signature strip 22 along the pre-weakened area 18 and tears the strip 22 from the card leaving the entire card shorter in length by the width of the strip 22. The initial recipient then signs the card on the lowermost remaining blank signature strip, indicated by reference numeral 20 in FIG. 1, and sends the card to another recipient.

The second recipient merely folds the card along the pre-weakened area 16 and removes the used signature strip at the bottom of the card, and signs the card on the lowermost remaining signature space provided thereabove. It will be apparent that the final user of the card will sign the card less all removable signature strips in the signature region adjacent the lower margin thereof and the card will thus have no pre-weakened areas such as 16, 18 remaining thereon.

Figure 2:
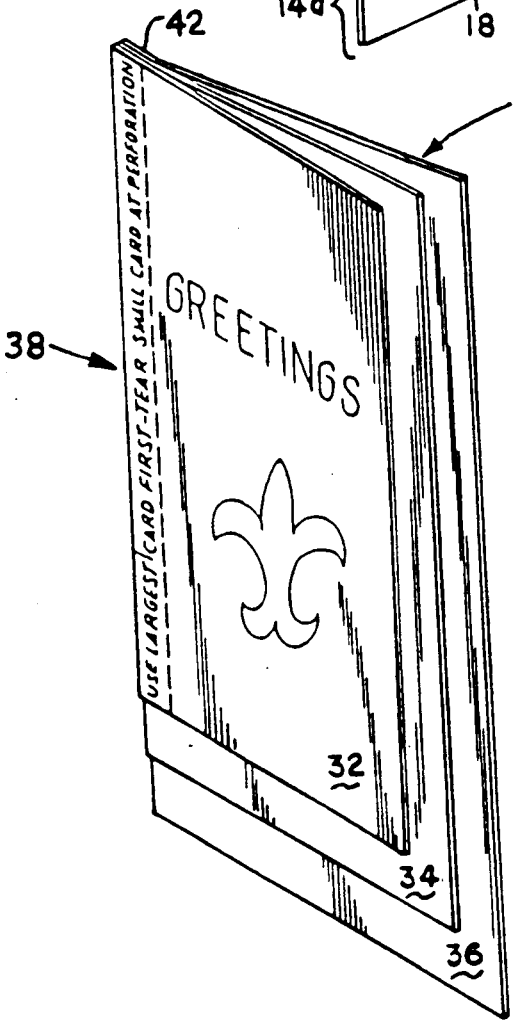
FIG. 2 is another embodiment of the invention employing a plurality of superposed layers joined at the left margin thereof.

Referring now to FIG. 2, another embodiment of the invention is shown wherein a multiple layer card indicated generally at 30 has a plurality of layers 32, 34, 36 which are disposed in superposed relationship and aligned at the left margin thereof. The layers 32, 34 36 are joined at the left margin thereof by any suitable expedient in the region on each layer disposed beneath the portion to the left of the dashed line running vertically along the layer 32 in FIG. 2. In the presently preferred practice of the invention, the layers 32, 34 36 each have a progressively decreased length proceeding from the bottom layer 36 to the top layer 32 so that a portion of the immediately preceding layer extends outwardly from and [invisible] *is visible* when the next superposed layer is in place. In the presently preferred practice of the invention, the layers 32, 34 36 are joined in the region indicated by numeral 38 with a suitable adhesive material which permits removal of the desired layer without evidence of defacing or damage to the superposed card layer.

In use, the initial purchaser of the card of FIG. 2 signs the card at the bottom of the portion of layer 36 which is visible from the top of the superposed layers and sends the card. The initial recipient removes the bottom layer of the card 36 by peeling the layer 36 away from the adhesively bonded left margin and signs the card on the visible signature strip at the lower margin of the layer 34 and sends the card on to another recipient. The second recipient then peels the card layer 34 away from the adhesively bonded region on the left margin and leaves the top layer of the card for subsequent use.

In the presently preferred practice of the invention, the top layer 32 of the card is provided with a pre-weakened area indicated by the dashed line at 40 in FIG. 2 which may be removed frangibly by tearing the card layer 32 along the left margin thereof. In the presently preferred practice of the invention, the pre-weakened area 42 comprises a line of spaced perforations extending vertically along the full length of the margin of card layer 32. It will be understood however, that other pre-weakening means may be employed as for example, a frangible region formed by embossing at the time the card is manufactured.

Figure 3:
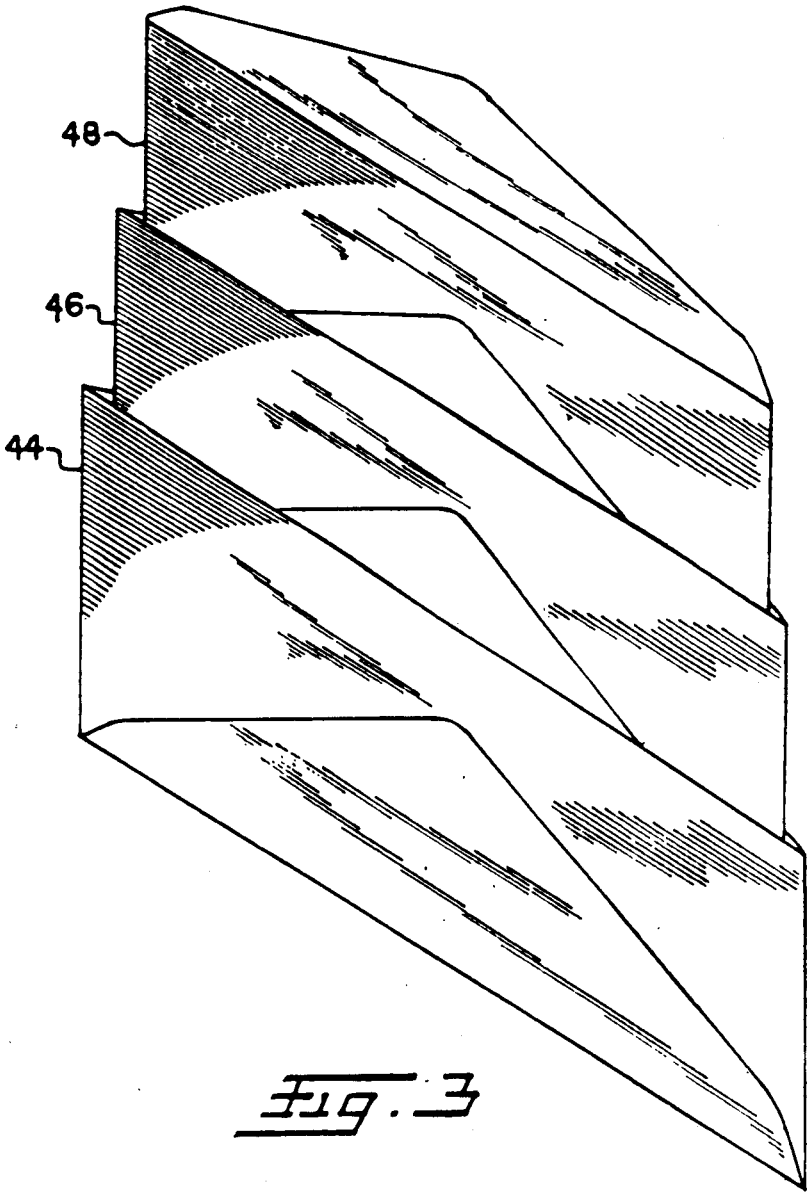
FIG. 3 is a perspective view of the nestable envelopes for the ensemble.

It will be apparent that the embodiments 10, 30 of the card described hereinabove grown progressively shorter as the card is used by each successive use. Accordingly, the initial purchaser of the card receives, along with the card, a set or plurality of envelopes each having a length corresponding to the length of the card as it appears to each recipient from the initial recipient to the final recipient. The envelopes are shown in FIG. 3 indicated by the numerals 44, 46, 48 and are shown as nested for the sake of illustrating the progressively reduced length of the envelopes. It will be understood however that the envelopes need not be nested other than to be included with the card; however, it will be understood that for convenience the shorter envelopes may be contained within the larger envelopes if desired, the choice being in accordance with the particular marketing practice of the card vendor.

The present invention thus comprises a reusable greeting card ensemble comprising a card having a plurality of removable signature portions which leave the card successively shorter in length for each recipient to sign and reuse. The card is supplied with a plurality or set of envelopes sized to accommodate the card at each stage of its reduced length. The present invention thus provides a reusable greeting card which shows little evidence of previous usage and yet provides a card which may have an attractiveness and decorativeness of an elaborate single use throw-away card.

Although the inventions has hereinabove been described with respect to the presently preferred practice, it will be understood to those skilled in the art that modifications and variations may be made in the practice of the invention without departing from the limits of the following claims.

I claim:

1. A reusable greeting card comprising: a card proper formed of a single-folded material having the greeting message provided on the upper portion of the card with the fold disposed vertically and having at least one removable sender's signature section provided across the full width of the card adjacent the lower margin, said card having a pre-weakened region intermediate the signature section and the upper portion of the card, wherein said pre-weakened portion is frangible to permit removal of the signature section whereby the entire card proper becomes shorter in length, said upper portion having at least one other signature region provided adjacent and above said pre-weakened region for a second sender's use.

2. The reusable card defined in claim 1 wherein said pre-weakened region comprises a line of spaced perforations extending across the full width of the card.

3. An extended use greeting card ensemble comprising:

(a) a single fold material card proper having the greeting message disposed on the upper portion of the card with fold disposed vertically and having a pre-weakened region extending across the full width of the card adjacent the lower margin of the card to divide the card into an upper message portion and lower signature section, said pre-weakened region being frangible to readily permit removal of the signature section, whereby the entire card proper becomes shorter in length and whereupon the portion of the card adjacent said frangible region becomes the signature section for a next user;

(b) a first envelope sized to receive the card with said signature portion attached; and, (c) an additional envelope received accompanying said first envelope, said additonal envelope sized to fit said card only after removal of said signature section.

4. The ensemble defined in claim 3, wherein said pre-weakened region of said card comprises a line of exposed perforations extending across said card.

5. The ensemble defined in claim 3, wherein said envelopes are nested.

6. A reusable greeting card ensemble comprising:

a plurality of layers of single sheets, each bearing a message, arranged in superposed relationship and releasably joined along the left margin thereof and with the lower margin of each superposed sheet indexed from the next lower sheet to provide from the bottom superposed sheet to the top superposed sheet a plurality of sheets of progressively lesser length, wherein the lower marginal portion of the next lower sheet is exposed by the lower margin of the next superposed sheet, each said lower marginal portion defining a signature portion for that sheet, and said superposed sheets are removed successively from the bottom by each subsequent user.

7. The card ensemble defined in claim 6, wherein said superposed sheets are releasably joined at the left margin by an adhesive for peeling apart by each subsequent user.

8. A reusable greeting card ensemble comprising:

(a) a card proper formed of a plurality of layers of single sheets each bearing a message arranged in superposed relationship and releasably joined along the left margin thereof and with the lower margin of each superposed sheet indexed from the next lower sheet to provide from bottom to top a plurality of sheets of progressively lesser length, wherein the portion of the next lower sheet is exposed by the lower margin of the next superposed sheet, each said exposed portion defining a signature portion for that sheet, wherein said said sheets are removed successively from the bottom by each subsequent user;

(b) an envelope sized to receive the plurality of marginally joined sheets and having therewith additional envelopes each sized to receive said sheets after successive removal of one of said sheets.

9. The ensemble defined in claim 8, wherein said sheets are adhesively joined at the left margin for easy removal.

10. The ensemble defined in claim 8 wherein said envelopes are nested.

*11. A reusable greeting card ensemble comprising:*

*(a) a card proper formed of a plurality of layers of single sheets each bearing a message and arranged in superposed relationship releasably joined along one margin thereof and with the lower margin of each sheet indexed from the next adjacent sheet to provide a stack of sheets of progressively shorter length wherein the lower marginal portion of each sheet defines a signature portion for that sheet, wherein the sheets are removed successively by each subsequent user;*

*(b) an envelope sized to receive the plurality of marginally joined sheets and having therewith additional envelopes each sized to receive said sheets after successive removal of one of said sheets.*

*12. A reusable greeting card assembly comprising:*

*a plurality of layers of single sheets, each bearing a message and arranged in superposed relationship and releasably joined along one margin thereof with another margin of each sheet indexed from the next adjacent sheet to provide a stack of sheets progressively smaller, wherein the lower marginal portion of each sheet defines a signature portion for that sheet, wherein the sheets are removed successively by each subsequent user.*

* * * * *